United States Patent Office 3,099,031
Patented July 30, 1963

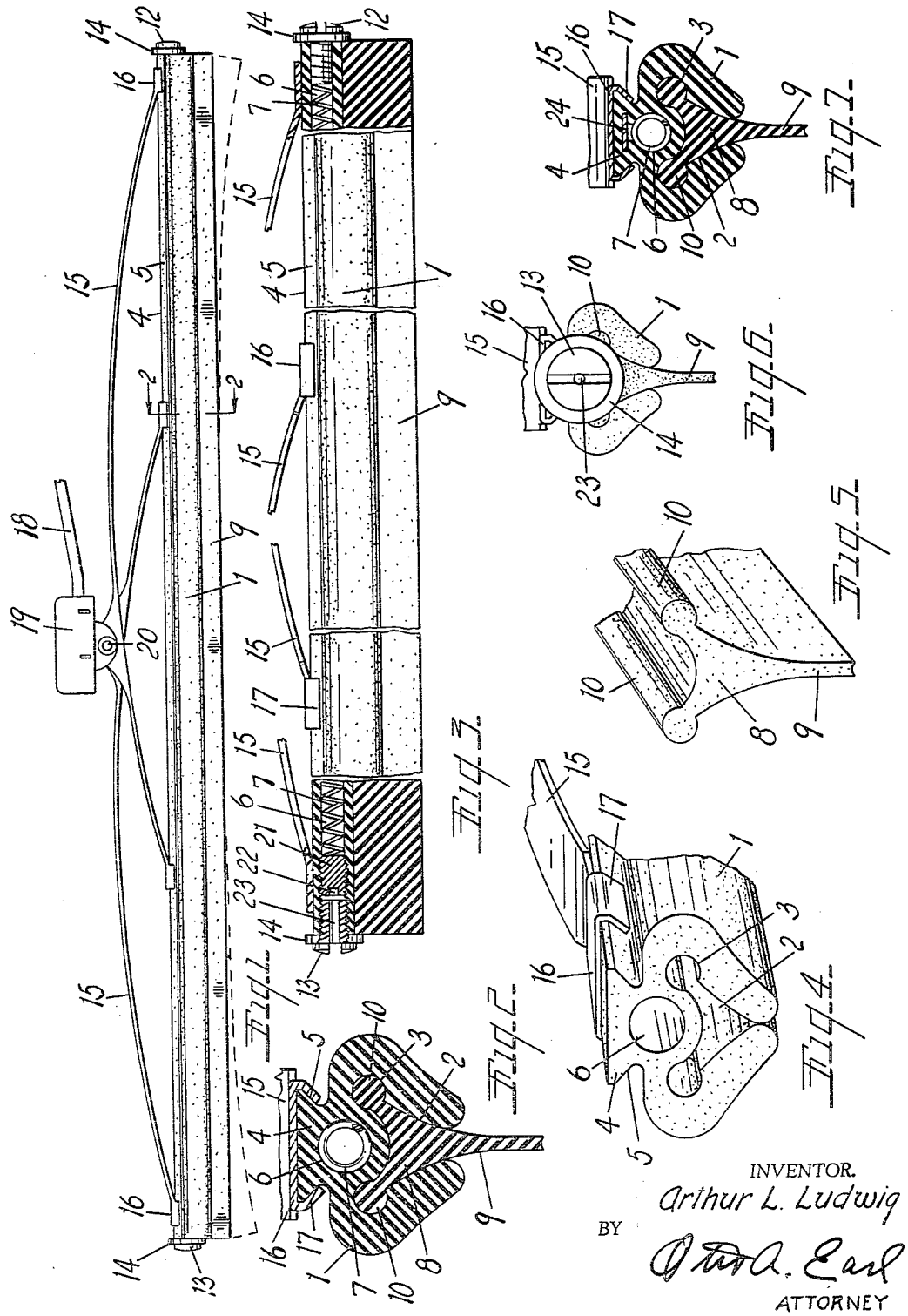

3,099,031
WINDSHIELD WIPER
Arthur L. Ludwig, Hastings, Mich., assignor to Hastings Manufacturing Company, Hastings, Mich.
Filed June 20, 1962, Ser. No. 204,306
24 Claims. (Cl. 15—250.42)

This invention relates to a windshield wiper assembly.
The main objects of this invention are:
First, to provide a windshield wiper assembly which is adapted for use on windshields of widely varying contours.
Second, to provide a windshield wiper assembly which includes a body or support member and a blade member, both of which are in the preferred embodiment of applicant's invention of nonmetallic material and have varying degrees of flexibility.
Third, to provide a windshield wiper assembly in which the wiper blade may be readily replaced or renewed in the event it becomes worn or damaged.
Fourth, to provide a windshield wiper assembly in which the blade unit is effectively supported by bowed springable support members to which it is attached without the use of rivets or pivots.
Fifth, to provide a windshield wiper assembly having these several advantages in which the parts may be economically produced and assembled.

Objects relating to details and economies of the invention will appear from the description to follow. The invention is defined and pointed out in the claims. A preferred embodiment of the invention is illustrated in the accompanying drawing, in which:

FIG. 1 is a side elevational view of a windshield wiper embodying my invention with the wiper unit in straight position, the operating arm being partially broken away.
FIG. 2 is an enlarged cross sectional view on a line corresponding to line 2—2 of FIG. 1.
FIG. 3 is an enlarged fragmentary side elevational view with portions shown in vertical longitudinal section.
FIG. 4 is an enlarged perspective view of the body member and a fragment of one of the supporting arms.
FIG. 5 is a fragmentary perspective view of the blade unit or member.
FIG. 6 is a fragmentary end view.
FIG. 7 is a fragmentary cross sectional view corresponding to that of FIG. 2 of a modified form or embodiment of my invention.

It will be understood that windshields in different makes or styles and grades of automobiles vary greatly in shape or contour and that one of the main objects of the applicant's invention is to provide a wiper which is adaptable and efficient for use on windshields of widely varying shapes without any structural variations or changes in the wiper unit.

It should also be borne in mind that in the accompanying drawing the wiper unit is illustrated as being perfectly straight but that one of the primary advantages is that in use it readily conforms to varying windshield shapes and that the work stroke of the wiper is commonly over surfaces which vary substantially in shape within the stroke of the wiper.

In the embodiment of my invention illustrated the body member 1 is formed of rubber or resilient thermoplastic material, the material being conventionally illustrated and is of inwardly tapered cross section and has a longitudinally extending slot-like recess 2 therein of dovetail cross section and enlargements 3 at its edges. The body member has an integral longitudinal rib 4 on its outer edge of dovetail cross section providing oppositely facing grooves 5 of substantial depth, see FIGS. 2 and 4.

The body member has a longitudinal bore 6 extending from end to end thereof and disposed between the longitudinal slit or opening 2 and the outer side of the body member. A coil spring 7 is fittingly disposed in this bore, as is illustrated in FIGS. 2 and 3, with its ends in spaced relation to the ends of the body member, see FIG. 3.

The blade member 8 is of T-cross section and is desirably of flexibly resilient nonmetallic material of a flexibility substantially exceeding that of the body member and is fittingly disposed in the groove 2 with its blade-like portion 9 projecting substantially from the body member. The laterally projecting arms terminate in bead-like edge portions 10 fittingly disposed in the enlargements 3 of the body member recess.

The blade member is introduced endwise into the body member and is effectively connected thereto so it cannot be pulled out or removed sidewise of the body member, that is the blade member must be inserted in and removed from the body member by a longitudinal movement. The blade member is retained against longitudinal movement relative to the body member by the retaining members 12 and 13 which, in the embodiment illustrated, are provided with collars 14 and are threaded into the body member. As shown in FIGS. 3 and 6, these members 12 and 13 not only serve to retain their collar 14, which may be an integral part thereof, and spring 7 but overlap the ends of the blade serving as retaining members therefor and closure members for the ends of bore 6. They also serve as means for preventing the removal of the bowed springably resilient support members 15 which have integral clips 16 on their ends provided with inturned inwardly projecting flanges 17 which engage the dovetail or laterally projecting edges of the rib of the body member, as is illustrated in the drawing. Member 12 also serves as an abutment for the spring 7.

While this retaining engagement is highly effective it will be understood that there is some sliding movement of the clip portions, at least at one end of the support members when they are subjected to bending thrust which commonly results when the wiper is installed; that is the actuating arm 18 imparts inward thrust through the coupling unit 19 to the members 15 which are connected by the pivot 20, the coupling member 19 also being engaged with the pivot 20. With this arrangement of parts, there is a substantially uniform thrust on the wiper unit throughout its length and that is maintained as the wiper unit is reciprocated over a surface of varying shape or curvature.

In the embodiment of applicant's invention illustrated, an adjustable abutment member 21 is provided for the spring 7, this member 21 having a socket 22 therein adapted to receive an adjusting tool, the member 13 having a longitudinal opening 23 therein adapted to receive the tool. This provides for adjustment of the spring to vary the compression stress thereof and also for adaptation of springs which may vary somewhat in strength.

The embodiment of my invention shown in FIG. 7 is substantially the same as that described with the addition of the blade spring 24 to extend longitudinally through the outer dovetail portion of the body member laterally stiffening the same and further reinforcing the body member generally which, as stated, is desirably formed of rubber or some thermoplastic material having the general characteristics of rubber.

I have not illustrated or described other embodiments or adaptations of my invention as it is believed this disclosure will enable those skilled in the art to embody or adapt the invention as may be desired.

Having thus described the invention, what is claimed as new and desired to secure by Letters Patent is:
1. A windshield wiper assembly comprising an elon- gated body member of flexibly resilient nonmetallic material having an integral longitudinally extending rib of dovetailed section on its outer edge and having a longitudinal groove of dovetail section opening at its inner edge and extending from end to end thereof, said body member also having a longitudinal bore therein disposed between said groove and said rib, a blade member of T-cross section and of flexibly resilient nonmetallic material of a flexibility substantially exceeding that of said body member fittingly disposed in said groove with its blade-like intermediate portion projecting inwardly from said body member, a coiled spring supportedly disposed in said bore in said body member with its ends adjacent but inwardly spaced from the ends thereof, a bore closure and spring abutment member retainingly engaged with said body member at one end thereof and having a portion overlapping the adjacent end of said blade member groove, an adjustable abutment member for the other end of said spring adjustably disposed in the other end of said bore in thrust supporting engagement with said spring, a bore closure member for that end of said bore disposed at the outer side of said adjustable abutment member and supportedly connected to said body member and having a portion overlapping the adjacent end of said blade member groove, a pair of outwardly bowed resiliently springable support members disposed in crossing relation and pivotally connected to each other and having integral clips on their ends disposed in retaining slidable engagement with said rib on said body member, and an actuating arm coupling member pivotally engaged with said pivotal connection for said support members.

2. A windshield wiper assembly comprising an elongated body member of flexibly resilient nonmetallic material having an integral longitudinally extending rib of dovetailed section on its outer edge and having a longitudinal groove of dovetail section opening at its inner edge and extending from end to end thereof, said body member also having a longitudinal bore therein disposed between said groove and said rib, a blade member of T-cross section and of flexibly resilient nonmetallic material of a flexibility substantially exceeding that of said body member fittingly disposed in said groove with its blade-like intermediate portion projecting inwardly from said body member, a coiled spring supportedly disposed in said bore in said body member with its ends adjacent but inwardly spaced from the ends thereof, spring retaining and abutment members disposed in said bore in thrust engagement with the ends of the spring, at least one of said abutment members being supportedly adjustable longitudinally of the bore, a pair of outwardly bowed resiliently springable support members disposed in crossing relation and pivotally connected to each other and having integral clips on their ends disposed in retaining slidable engagement with said rib on said body member, and an actuating arm coupling member pivotally engaged with said pivotal connection for said support members.

3. A windshield wiper assembly comprising an elongated body member of flexibly resilient nonmetallic material having an integral longitudinally extending rib of dovetailed section on its outer edge and having a longitudinal groove of dovetail section opening at its inner edge and extending from end to end thereof, the arms of said groove terminating in enlargements, said body member also having a longitudinal bore therein disposed between said groove and said rib, a blade member of T-cross section and of flexibly resilient nonmetallic material of a flexibility substantially exceeding that of said body member fittingly disposed in said groove with its blade-like intermediate portion projecting inwardly from said body member, a coiled spring supportedly disposed in said bore in said body member with its ends adjacent but inwardly spaced from the ends thereof, abutment members for said spring disposed in said bore of said body member, a pair of outwardly bowed resiliently springable support members disposed in crossing relation and pivotally connected to each other and having integral clips on their ends disposed in retaining slidable engagement with said rib on said body member, and an actuating arm coupling member pivotally engaged with said pivotal connection for said support members.

4. A windshield wiper assembly comprising an elongated body member of flexibly resilient nonmetallic material having an integral longitudinally extending rib of dovetailed section on its outer edge and having a longitudinal groove of dovetail section opening at its inner edge and extending from end to end thereof, said body member also having a longitudinally extending opening therein disposed intermediate said rib and said groove, a blade member of flexibly resilient nonmetallic material and of a degree of flexibility substantially exceeding that of said body member having an inner portion fittingly and supportingly disposed in said groove and having a resilient portion projecting inwardly from said body member, a springably resilient reinforcing member disposed in said longitudinal opening in said body member with its ends in spaced relation to but adjacent the ends thereof, an abutment member for one end of said reinforcing member supportedly mounted on said body member at one end of said bore and having a portion overlapping the adjacent end of said blade member groove, an adjustable abutment member for the other end of said reinforcing member adjustably disposed within said bore, a bore closing and blade retaining member disposed at the outer side of said adjustable abutment member, and a pair of outwardly bowed springable support members disposed in cross relation to each other and pivotally connected and having end portions disposed in retaining engagement with said rib on said body member, and an actuating arm coupling member pivotally engaged with said pivotal connection for said support members.

5. A windshield wiper assembly comprising an elongated body member of flexibly resilient nonmetallic material having an integral longitudinally extending rib of dovetailed section on its outer edge and having a longitudinal groove of dovetail section opening at its inner edge and extending from end to end thereof, a blade member of flexibly resilient nonmetallic material and of a degree of flexibility substantially exceeding that of said body member having an inner portion fittingly and supportingly disposed in said groove and having a resilient portion projecting inwardly from said body member, and a pair of outwardly bowed springable support members disposed in cross relation to each other and pivotally connected and having end portions disposed in retaining engagement with said rib on said body member, and an actuating arm coupling member pivotally engaged with said pivotal connection for said support members.

6. A windshield wiper assembly comprising an elongated body member of flexibly resilient nonmetallic material having an integral longitudinally extending rib of dovetailed section on its outer edge and having a longitudinal groove of dovetail section opening at its inner edge and extending from end to end thereof, the arms of said grove terminating in enlargements, a blade member of flexibly resilient nonmetallic material and of a degree of flexibility substantially exceeding that of said body member having an inner portion fittingly and supportingly disposed in said groove and having a resilient portion projecting inwardly from said body member, and a pair of outwardly bowed springable support members disposed in cross relation to each other and pivotally connected and having end portions disposed in retaining engagement with said rib on said body member, and an actuating arm coupling member pivotally engaged with said pivotal connection for said support members.

7. A windshield wiper assembly comprising an elongated body member of flexibly resilient nonmetallic material having a longitudinal groove of dovetailed section opening at its inner edge and extending from end to end thereof, said body member also having a longitudinally extending bore therein disposed outwardly of said groove, a blade member of flexibly resilient nonmetallic material and of a degree of flexibility substantially exceeding that of said body member having an inner portion fittingly and supportingly disposed in said groove and having a flexible resilient portion projecting inwardly from said body member, a coiled spring reinforcing member disposed in said longitudinal bore in said body member with its ends in spaced relation to but adjacent the ends thereof, an abutment member for one end of said reinforcing member supportedly mounted on said body member at one end of said bore and having a portion overlapping the adjacent end of said blade member groove, an adjustable abutment member for the other end of said reinforcing member adjustably disposed within said bore, a bore closing and blade retaining member disposed at the outer side of said adjustable abutment member, and a pair of outwardly bowed springable support members disposed in crossed pivotally connected relation to each other having end portions disposed in retaining engagement with said body member.

8. A windshield wiper assembly comprising an elongated body member of flexibly resilient nonmetallic material having a longitudinal groove of dovetailed section opening at its inner edge and extending from end to end thereof, a blade member of flexibly resilient nonmetallic material and of a degree of flexibility substantially exceeding that of said body member having an inner portion fittingly and supportingly disposed in said groove and having a flexible resilient portion projecting inwardly from said body member, and a pair of outwardly bowed springable support members disposed in crossed pivotally connected relation to each other having end portions disposed in retaining engagement with said body member.

9. A windshield wiper assembly comprising an elongated flexibly resilient body member having a longitudinal groove therein, there being a relatively restricted slot-like opening to said groove in the inner edge of said body member, said body member having a longitudinally extending opening disposed in outwardly spaced relation to said groove, a blade member of flexibly resilient material disposed in said groove and having a continuous contact portion projecting inwardly from the body member, a reinforcing spring extending longitudinally of said body member disposed therein at the outer side of said groove, and a pair of outwardly bowed springable support members disposed in crossed relation to each other and pivotally connected and having end portions disposed in retaining engagement with said body member.

10. A windshield wiper unit comprising an elongated body member of flexibly resilient nonmetallic material having a longitudinal groove of dovetailed section opening at its inner edge and extending from end to end thereof, said body member also having a longitudinally extending opening therein disposed outwardly of said groove, a blade member of flexibly resilient nonmetallic material having an inner portion fittingly and supportingly disposed in said groove and having a flexible resilient portion projecting inwardly from said body member, a reinforcing member disposed in said longitudinal opening in said body member with its ends in spaced relation to but adjacent the ends thereof, and retaining members disposed in the ends of said opening in retaining engagement with the ends of said reinforcing member.

11. A windshield wiper assembly comprising an elongated body member of flexibly resilient material having a longitudinal groove opening at its inner edge, said body member also having a longitudinally extending opening therein disposed outwardly of said groove, a blade member of flexibly resilient material fittingly and supportingly disposed in said groove and having a flexible resilient portion projecting inwardly from said body member, a springable reinforcing member disposed in said londitudinal opening in said body member at the outer side of said bore, and a pair of outwardly bowed springable support members disposed in crossed pivotally connected relation to each other having end portions disposed in retaining engagement with said body member.

12. A windshield wiper assembly comprising a body member of flexibly resilient material having a groove extending longitudinally thereof and opening at its inner edge and having a longitudinally extending rib on its outer edge, a reinforcing member disposed in said body member between said groove and said rib, a blade member having an enlarged inner portion disposed in said groove and provided with a flexible portion projecting inwardly from said body member, and a pair of outwardly bowed springable support members disposed in crossed relation and pivotally connected to each other and having integral end portions disposed in retaining engagement with said rib on said body member.

13. A windshield wiper assembly comprising a body member of flexibly resilient material having a groove extending longitudinally thereof and opening at its inner edge and having a longitudinally extending rib on its outer edge, a blade member having an enlarged inner portion disposed in said groove and provided with a flexible portion projecting inwardly from said body member, and a pair of outwardly bowed springable support members disposed in crossed relation and pivotally connected to each other and having integral end portions disposed in retaining engagement with said rib on said body member.

14. A windshield wiper comprising an elongated flexibly resilient nonmetallic body member having a longitudinal groove therein having a relatively restricted slot-like opening at the inner side of said body member, a springable reinforcing member supportedly disposed in said body member at the outer side of said groove and extending longitudinally of said body member, a wiper blade member of flexible resilient material disposed in said groove and having a continuous contact portion projecting inwardly from said body member, and retaining members for said blade member mounted on said body member at the ends thereof, said retaining members being also in end thrust engagement with said reinforcing member.

15. A windshield wiper assembly comprising an elongated body member of flexibly resilient nonmetallic material having an integral longitudinally extending rib of dovetailed section on its outer edge and having a longitudinal groove of dovetail section opening at its inner edge, a blade member of flexibly resilient nonmetallic material and of a degree of flexibility substantially exceeding that of said body member having an inner portion fittingly and supportingly disposed in said groove and having a resilient portion projecting inwardly from said body member, and a pair of outwardly bowed springable pivotally connected support members disposed in cross relation to each other and having clip portions at their ends disposed in retaining engagement with said rib on said body member.

16. A windshield wiper assembly comprising an elongated body member of flexibly resilient nonmetallic material having an integral longitudinally extending rib of dovetailed section on its outer edge and having a longitudinal groove opening at its inner edge, said body member also having a longitudinally extending bore therein disposed between said rib and said groove, said rib having a longitudinal opening therein of flat cross section, a coiled spring reinforcing member disposed in said bore in said body member, a flat blade-like spring disposed in said opening in said rib, a blade member of flexibly resilient material retainingly disposed in said groove and having a blade-like relatively flexible portion projecting therefrom, and a pair of outwardly bowed springable support members disposed in crossed and pivotally connected relation to each other and having integral clips on their ends disposed in retaining engagement with said rib on said body member with their inner edges projecting below the plane of said spring member in said rib.

17. A windshield wiper assembly comprising an elongated body member of flexibly resilient nonmetallic material having an integral longitudinally extending rib of dovetailed section on its outer edge and having a longitudinal groove opening at its inner edge, said rib having a longitudinal opening therein of flat cross section, a flat blade-like spring disposed in said opening in said rib, a blade member of flexibly resilient material retainingly disposed in said groove and having a blade-like relatively flexible portion projecting therefrom, and a pair of outwardly bowed springable support members disposed in crossed and pivotally connected relation to each other and having integral clips on their ends disposed in retaining engagement with said rib on said body member with their inner edges projecting below the plane of said spring member in said rib.

18. A windshield wiper assembly comprising an elongated body member of flexibly resilient nonmetallic material provided with a wiper blade and having an integral longitudinally extending rib of dovetailed section on its outer edge, said body member also having a longitudinally extending opening therein disposed in inwardly spaced relation to said rib, said rib having a longitudinal opening therein, a reinforcing spring member disposed in said opening in said body member, a flat blade-like spring disposed in said opening in said rib, and a pair of outwardly bowed springable support members disposed in crossed and pivotally connected relation and having integral clips at their ends, converging flanges disposed in fitting engagement with the edges of said rib on said body member and with their inner edges projecting below the plane of said spring member in said rib.

19. A windshield wiper assembly comprising an elongated body member of flexibly resilient nonmetallic material provided with a wiper blade and having an integral longitudinally extending rib of dovetailed section on its outer edge, said rib having a longitudinal opening therein, a flat blade-like spring disposed in said opening in said rib, and a pair of outwardly bowed springable support members disposed in crossed and pivotally connected relation and having integral clips at their ends, converging flanges disposed in fitting engagement with the edges of said rib on said body member and with their inner edges projecting below the plane of said spring member in said rib.

20. A windshield wiper assembly comprising an elongated body member of flexibly resilient nonmetallic material provided with a wiper blade and having an integral longitudinally extending rib on its outer edge, said rib having a longitudinally extending blade-like spring imbedded therein, said body member also having a longitudinally extending spring imbedded therein and disposed in inwardly spaced relation to said rib in aligned relation to said spring imbedded in said rib, and outwardly bowed springable support members disposed in crossed pivotally connected relation to each other and having clips on their ends retainingly engaged with said rib laterally of said spring imbedded therein.

21. A windshield wiper assembly comprising an elongated body member of flexibly resilient nonmetallic material provided with a wiper blade and having an integral longitudinally extending rib on its outer edge, said rib having a longitudinally extending blade-like spring imbedded therein, and outwardly bowed springable support members disposed in cross pivotally connected relation to each other and having clips on their ends retainingly engaged with said rib laterally of said spring imbedded therein.

22. A windshield wiper assembly comprising an elongated body member of flexibly resilient nonmetallic material having a longitudinal groove opening at its inner edge, said body member having a longitudinally extending opening therein disposed outwardly of said groove, a blade member of flexibly resilient material supportedly disposed in said groove with a portion thereof projecting inwardly from said body member, a coiled spring reinforcing member disposed in said longitudinal opening in said body member with its ends in spaced relation to the ends thereof and an adjusting member in thrust engagement with one end of said spring and having threaded engagement with said body member, and a closure member for said longitudinal opening in said body member disposed at the outer side of said spring adjusting member and having a tool receiving opening therein facilitating the adjustment of said spring adjusting member.

23. A windshield wiper assembly comprising an elongated body member of flexibly resilient nonmetallic material having a longitudinal groove opening at its inner edge, said body member having a longitudinally extending opening therein disposed outwardly of said groove, a blade member of flexibly resilient material supportedly disposed in said groove with a portion thereof projecting inwardly from said body member, a coiled spring reinforcing member disposed in said longitudinal opening in said body member with its ends in spaced relation to the ends thereof and an adjusting member in thrust engagement with one end of said spring and having threaded engagement with said body member, and a closure member for said longitudinal opening in said body member disposed at the outer side of said spring adjusting member.

24. A windshield wiper comprising an elongated flexibly resilient nonmetallic body member provided with a wiper blade member of a flexibility exceeding that of the body member, the body member having a longitudinal bore therein extending from end to end thereof, a coiled spring disposed in said longitudinal bore in said body member with its ends in spaced relation to but adjacent to the ends thereof, and spring retaining and abutment members disposed in said bore in thrust sustaining engagement with the ends of the spring, at least one of said abutment members being adjustable longitudinally of the bore.

References Cited in the file of this patent

UNITED STATES PATENTS

| | | |
|---|---|---|
| 2,587,382 | Pyne | Feb. 26, 1952 |
| 2,741,792 | Ehrlich et al. | Apr. 17, 1956 |